Patented Apr. 13, 1937

2,076,872

UNITED STATES PATENT OFFICE 2,076,872

INDIGOID VAT DYESTUFF

Werner Zerweck and Eduard Albrecht, Frankfort-on-the-Main-Fechenheim, Germany, assignors to General Aniline Works, Inc., New York, N. Y., a corporation of Delaware No Drawing. Application May 25, 1934, Serial No. 727,586. In Germany June 8, 1933

1 Claim. (Cl. 260—53)

Our present invention relates to new indigoid vat dyestuffs, more particularly to those corresponding to the general formula

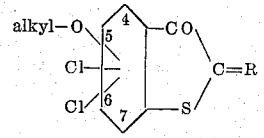

(wherein the alkoxy group stands in 5, 6 or 7 position, one ortho position to the said alkoxy group is free and R means an isatine or hydroxy-thionaphthene radical of the benzene or naphthalene series).

These new dyestuffs are distinguished by the beautiful shades and the good fastness of their dyeings and printings. In some cases their tinctorial properties may be further enhanced by after-halogenation.

The alkoxy-dichloro-hydroxy-thionaphthenes, being the starting materials of our new dyestuffs may be obtained by converting the corresponding alkoxy-dichloro-benzene-sulfonic acids into the sulfochlorides, mercaptans, thioglycollic acids and ring-closing the latter or also by introducing a sulfur-containing radical into the ortho position to the amino group of a corresponding alkoxy-dichloro-amino-benzene according to one of the known methods.

These hydroxy-thionaphthenes are, themselves or after the transformation into their reactive 2-derivatives, condensed with isatines or hydroxy-thionaphthenes of the benzene or naphthalene series or respectively with the reactive 2-derivatives thereof.

In order to further illustrate our invention the following examples are given, the parts being by weight and all temperatures in centigrade degrees; but we wish it, however, to be understood that our invention is not limited to the particular products nor reaction conditions given therein:

Example 1

12.5 parts of 5-methoxy-6.7-dichloro-3-hydroxy-thionaphthene are stirred for two hours at 100° C. with 11.6 parts of 8-chloro-1.2-naphthisatine and 150 parts of glacial acetic acid. After cooling the formed dyestuff is filtered off by suction. It corresponds probably to the following formula

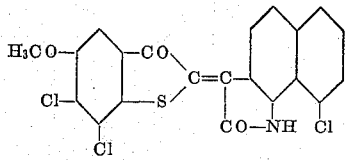

and dyes cotton from a yellow vat gray shades of excellent fastness qualities and dissolves in sulfuric acid with a yellowish brown color.

The 5-methoxy-6.7-dichloro-3-hydroxy-thionaphthene may be obtained for example in the following manner:—

The sodium salt of the 2.3-dichloro-anisole-4-sulfonic acid, easily obtainable by sulfonation and subsequent alkylation of 2.3-dichloro-phenol, is transformed into the corresponding sulfochloride by heating with phosphorus pentachloride. This sulfochloride may be also obtained by treating 2.3-dichloro-anisole with chlorosulfonic acid. The mercaptan which is obtained therefrom by reduction is transformed into the thioglycollic acid in an alkaline solution by means of monochloro-acetic acid. When recrystallized from acetic acid of 50% strength the 1-methoxy-2.3-dichloro-benzene-4-thioglycollic acid shows a melting point of 159° C. From this thioglycollic acid the 5-methoxy-6.7-dichloro-3-hydroxy-thionaphthene may be obtained by means of phosphorus trichloride and aluminium chloride.

Example 2

11.3 parts of 5-bromo-isatine are heated to 100° C. for about 1 hour in 200 parts of chlorobenzene with 10.5 parts of phosphoruspentachloride. The solution of the formed 5-bromo-isatine-chloride runs at 50–60° C. into a suspension of 12.5 parts of 5-methoxy-4.7-dichloro-3-hydroxy-thionaphthene in 100 parts of chlorobenzene. After three hours' stirring at 80° C. the dyestuff is separated and when cool it is filtered off by suction. It corresponds to the following formula

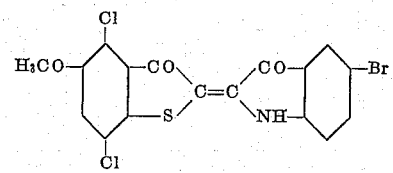

It forms a bluish violet powder and dyes cotton from a yellow vat navy blue shades. In sulfuric acid it dissolves with a greenish blue color.

The 5-methoxy-4.7-dichloro-3-hydroxy-thionaphthene may be obtained from the sodium salt of the 2.5-dichloro-anisole-4-sulfonic acid in an analogous manner as described in Example 1. The 1-methoxy-2.5-dichloro-benzene-4-thioglycollic acid which melts at 116° C. can be easily transformed into the 5-methoxy-4.7-dichloro-3-hydroxy-thionaphthene by chlorosulfonic acid.

Example 3

13.2 parts of 6-ethoxy-4.7-dichloro-3-hydroxy-thionaphthene and 15.6 parts of 6-methoxy-2.3-diketo-dihydro-thionaphthene-2-(p-dimethylamino-anil) are heated while stirring to 120° C. for 2-3 hours with 200 parts of glacial acetic acid. After cooling the formed dyestuff is filtered off by suction. It corresponds to the following formula

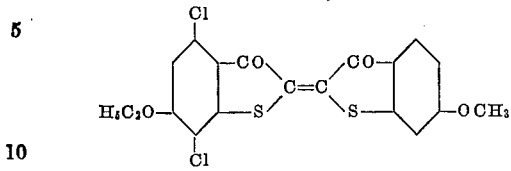

forms an orange colored powder, dissolves in sulfuric acid with a violet color and dyes cotton from a yellow vat bright orange shades of good fastness qualities.

The 6-ethoxy-4.7-dichloro-3-hydroxy-thionaphthene may be produced according to the following scheme:—chlorohydrate of the 2.5-dichloro-4-ethoxy-aniline→sulfurchloride compound→1-amino-2.5-dichloro-4-ethoxy-benzene-6-thioglycollic acid→cyanogen-compound→aminothionaphthene-carboxylic acid→6-ethoxy-4.7-dichloro-hydroxy-thionaphthene. It may be purified by recrystallization from glacial acetic acid and melts at 191–192° C.

*Example 4*

By one hour's heating in 150 parts of chlorobenzene with 10.5 parts of phosphorus pentachloride 10.8 parts of 5.7-dichloro-isatine are converted into the chloride. At 50° C. this solution is allowed to run into a suspension of 12.5 parts of 7-methoxy-4.5-dichloro-3-hydroxy-thionaphthene in 100 parts of chlorobenzene. After having stirred for three hours at 80° C. the formed dyestuff is filtered off by suction. It corresponds to the following formula

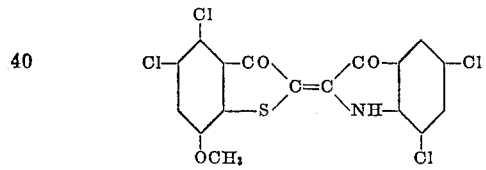

and dissolves in sulfuric acid with a blue color and dyes cotton blue shades.

The 7-methoxy-4.5-dichloro-3-hydroxy-thionaphthene may be produced from the 3.4-dichloro-anisole-6-sulfonic acid in an analogous manner as described in Example 1. The 3.4-dichloro-anisole-6-thioglycollic acid therefrom obtained melts at 122° C. By means of chlorosulfonic acid it may be converted into the 7-methoxy-4.5-dichloro-3-hydroxy-thionaphthene.

By variation of the components further dyestuffs may be obtained from the described thionaphthenes as the following table shows:—

| 5-methoxy-6.7-dichloro-3-hydroxy-thionaphthene yields with: | Color of the sulfuric acid solution | Color of the vat | Shade on cotton |
|---|---|---|---|
| 5.7-dichloro-isatine-chloride | Greenish blue | Yellow | Violet |
| 5.7-dibromo-isatine-chloride | Greenish blue | Yellow | Bluish violet |
| 2.1-naphthoxy-thiophene-anile | Dark blue | Orange | Brown |

| 5-methoxy-4.7-dichloro-3-hydroxy-thionaphthene yields with: | Color of the sulfuric acid solution | Color of the vat | Shade on cotton |
|---|---|---|---|
| 5.7-dichloro-isatine-chloride | Blue | Orange | Blue |
| 4-methyl-5-chloro-7-methoxy-isatine-chloride | Steel-blue | Yellow | Blue |
| 8-chloro-1.2-naphth-isatine-chloride | Green | | Yellow | Violet |

| 6-ethoxy-4.7-dichloro-3-hydroxy-thionaphthene yields with: | | | |
|---|---|---|---|
| 4-methyl-6-chloro-3-hydroxy-thionaphthene anile | Green | Yellow | Scarlet |
| 6-ethoxy-3-hydroxy-thionaphthene-anile | Violet | Yellow | Orange |
| 3-hydroxy-thionaphthene-anile | Olive | Yellow | Bluish red |

| 7-methoxy-4.5-dichloro-3-hydroxy-thionaphthene yields with: | | | |
|---|---|---|---|
| 4-methyl-5-chloro-7-methoxy-isatine-chloride | Blue | Yellow | Blue |
| 5-bromo-isatine-chloride | Blue | Yellow | Violet |
| 6-ethoxy-3-hydroxy-thionaphthene-anile | Olive-green | Yellow | Ruby |

The structural formulae given in the present application are, to the best of applicants' knowledge and belief, correct. However, it has been impossible to definitely determine that they are correct. Therefore, in case it is subsequently found that the structural formulae, or any of them, employed in the appended claims do not in fact correctly define the new products disclosed herein, then and in that event applicants wish it to be understood that they intended that such formulae should define the products obtainable in accordance with the disclosure of this application.

We claim:—

The indigoid vat dyestuff corresponding to the formula:

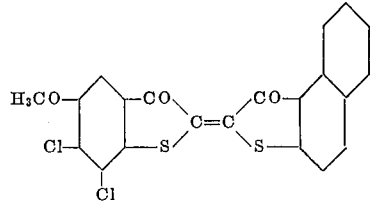

which dyestuff dissolves in concentrated sulfuric acid to a dark blue solution and dyes cotton from an orange vat brown shades.

WERNER ZERWECK.
EDUARD ALBRECHT.